(12) United States Patent
Shank et al.

(10) Patent No.: US 11,179,981 B2
(45) Date of Patent: *Nov. 23, 2021

(54) VEHICLE TRAILER CONNECT SYSTEM

(71) Applicant: UUSI, LLC, Reed City, MI (US)

(72) Inventors: David W. Shank, Hersey, MI (US); Josh Goulet, Holland, MI (US)

(73) Assignee: UUSI, LLC, Reed City, MI (US)

( * ) Notice: Subject to any disclaimer, the term of this patent is extended or adjusted under 35 U.S.C. 154(b) by 717 days.

This patent is subject to a terminal disclaimer.

(21) Appl. No.: 15/881,540

(22) Filed: Jan. 26, 2018

(65) Prior Publication Data

US 2018/0147900 A1 May 31, 2018

Related U.S. Application Data

(63) Continuation-in-part of application No. 13/798,478, filed on Mar. 13, 2013, now Pat. No. 9,914,333.

(Continued)

(51) Int. Cl.
*B60D 1/36* (2006.01)
*G05D 1/00* (2006.01)
(Continued)

(52) U.S. Cl.
CPC .............. *B60D 1/36* (2013.01); *B60D 1/62* (2013.01); *B60R 16/0373* (2013.01); *B60R 25/25* (2013.01); *B60R 25/257* (2013.01); *B62D 15/025* (2013.01); *B62D 15/0285* (2013.01); *G05D 1/0088* (2013.01); *G05D 1/0212* (2013.01); *G05D 1/0225* (2013.01); *G05D 1/0246* (2013.01); *G06K 9/00805* (2013.01); *G06K 9/3216* (2013.01); *G06T 5/002* (2013.01); *G06T 7/11* (2017.01); *G06T 7/13* (2017.01); *G06T 7/60* (2013.01); *G06T 7/73* (2017.01); *G06T 7/90* (2017.01); *B60R 2325/101* (2013.01); *B60R 2325/103* (2013.01); *B60R 2325/105* (2013.01); *B60R 2325/205* (2013.01); *G05D 2201/0213* (2013.01);

(Continued)

(58) Field of Classification Search
None
See application file for complete search history.

(56) References Cited

U.S. PATENT DOCUMENTS 5,265,021 A  11/1993  Avitan
6,273,771 B1  8/2001  Buckley et al.
(Continued)

FOREIGN PATENT DOCUMENTS

DE  10 2010 004 920 A1  7/2011

*Primary Examiner* — Nicholas K Wiltey
(74) *Attorney, Agent, or Firm* — Howard & Howard Attorneys PLLC

(57) ABSTRACT

A vehicle trailer connect system and automated parking system for use with a motor vehicle. Apparatus of the system has an input for obtaining information from a vehicle communication bus; an output for sending information to a vehicle communications bus; a control circuit for controlling the position and movement of a motor vehicle; an image gathering system to obtain visual or spatial data between a motor vehicle hitch and a hitch receiver attached to the trailer. A system controller guides vehicle steering as the vehicle is backed through a field of view of the image gathering system.

34 Claims, 11 Drawing Sheets

Related U.S. Application Data

(60) Provisional application No. 61/668,079, filed on Jul. 5, 2012.

(51) Int. Cl.
- *G05D 1/02* (2020.01)
- *B60R 16/037* (2006.01)
- *B60R 25/25* (2013.01)
- *G06T 5/00* (2006.01)
- *G06T 7/60* (2017.01)
- *G06T 7/13* (2017.01)
- *G06T 7/90* (2017.01)
- *G06T 7/11* (2017.01)
- *B62D 15/02* (2006.01)
- *G06K 9/00* (2006.01)
- *G06T 7/73* (2017.01)
- *B60D 1/62* (2006.01)
- *G06K 9/32* (2006.01)

(52) U.S. Cl.
CPC ........... *G06T 2207/10016* (2013.01); *G06T 2207/10024* (2013.01); *G06T 2207/30204* (2013.01); *G06T 2207/30252* (2013.01)

(56) References Cited

U.S. PATENT DOCUMENTS

| | | |
|---|---|---|
| 8,191,915 B2 | 6/2012 | Freese et al. |
| 9,340,197 B1 * | 5/2016 | Miersch-Wiemers ... B60D 1/62 |
| 2004/0016870 A1 | 1/2004 | Pawlicki et al. |
| 2005/0074143 A1 | 4/2005 | Kawai |
| 2006/0038381 A1 | 2/2006 | Gehring et al. |
| 2007/0118261 A1 | 5/2007 | Aguilar et al. |
| 2007/0208482 A1 | 9/2007 | Thiede et al. |
| 2008/0033647 A1 | 2/2008 | Milark et al. |
| 2008/0091309 A1 | 4/2008 | Walker |
| 2008/0091320 A1 | 4/2008 | Sakai |
| 2009/0236825 A1 | 9/2009 | Okuda et al. |
| 2010/0096203 A1 | 4/2010 | Freese et al. |
| 2010/0263142 A1 | 10/2010 | Jones et al. |
| 2010/0318241 A1 | 12/2010 | Post, II et al. |
| 2010/0324770 A1 * | 12/2010 | Ramsey ................... B60D 1/36 701/25 |
| 2011/0043633 A1 | 2/2011 | Sarioglu et al. |
| 2011/0216199 A1 * | 9/2011 | Trevino ................... B60D 1/36 348/148 |
| 2012/0185131 A1 * | 7/2012 | Headley ................ B60D 1/245 701/41 |
| 2012/0191285 A1 * | 7/2012 | Woolf ..................... B60D 1/36 701/25 |
| 2013/0002416 A1 | 1/2013 | Gazit |
| 2013/0226390 A1 | 8/2013 | Luo |
| 2014/0012465 A1 | 1/2014 | Shank et al. |
| 2017/0043806 A1 * | 2/2017 | Muharemovic ........ B60K 35/00 |
| 2017/0123431 A1 * | 5/2017 | Ghneim ............. B60W 10/184 |
| 2018/0039266 A1 * | 2/2018 | Dotzler ................... B60D 1/62 |

\* cited by examiner

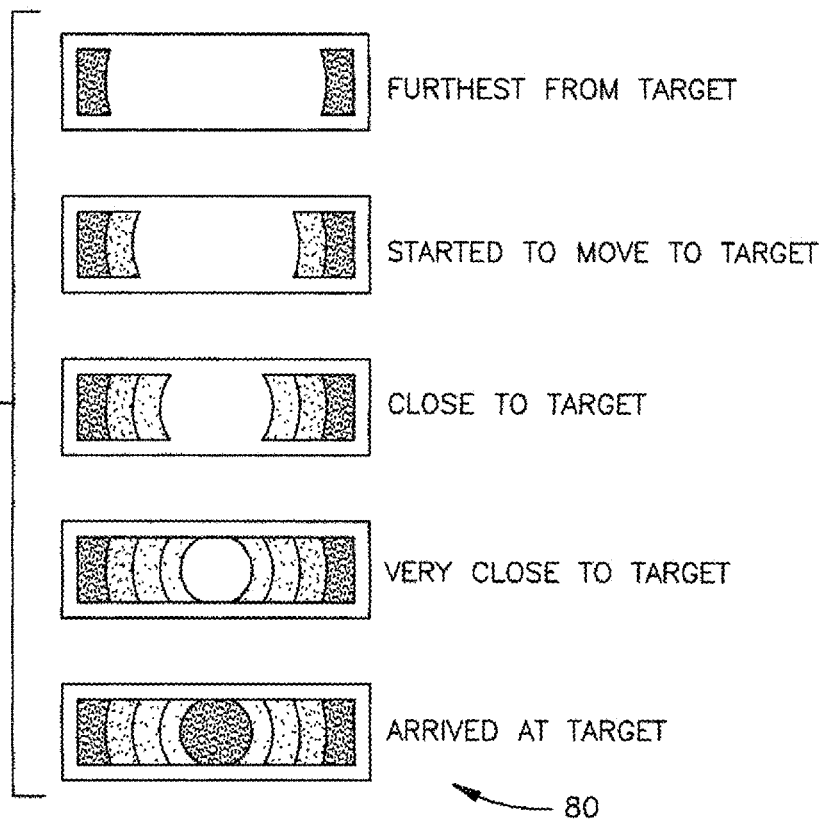
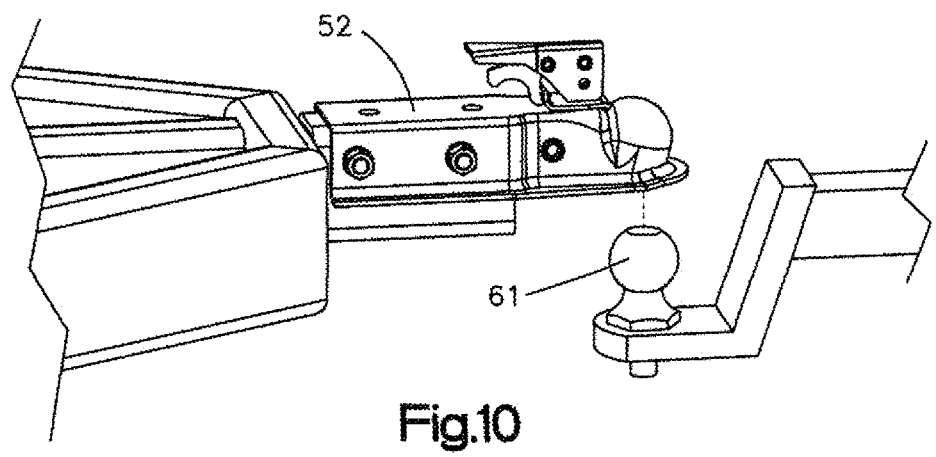

VEHICLE TRAILER CONNECT SYSTEM

CROSS-REFERENCE TO RELATED APPLICATION(S)

The present patent application is a continuation-in-part of U.S. patent application Ser. No. 13/798,478, filed Mar. 13, 2013, which claims priority from U.S. Provisional Patent Application entitled "Vehicle Trailer Connect System", filed Jul. 5, 2012, under Ser. No. 61/668,079, the disclosures of both applications of which are incorporated herein by reference in their entirety for all purposes.

BACKGROUND OF THE INVENTION

Field of the Invention

The present invention concerns a trailer hitching system for a vehicle that can either semi-automatically or fully automatically control a vehicle to align itself to a trailer hitch.

Background Art

Many present day motor vehicles include rear facing cameras to help a motorist in safely backing the motor vehicle and are used in addition to side and center positioned rear view mirrors.

SUMMARY OF THE INVENTION

The invention concerns apparatus and method for providing for the automatic alignment of a motor vehicle to a tow trailer.

An exemplary system has communications capability to send and receive data on a vehicle network for constructing an image of what is behind the vehicle. An electronic controller controls the communications, receiving and interpreting of image information, and determination of proper vehicle control to align the vehicle with a tow trailer.

One embodiment is coupled to a motor vehicle CAN communications bus and rearview camera system. The CAN bus provides information about the vehicle such as wheel angle, speed, and wheelbase dimension. The rearview camera system provides a detailed image about what is behind the vehicle. In an exemplary embodiment the system can accomplish alignment of a vehicle to a tow trailer quickly and accurately with limited involvement of the vehicle operator.

These and other objects advantages and features will become better understood from the following detailed description of one exemplary embodiment of the present invention which is described in conjunction with the accompanying drawings.

BRIEF DESCRIPTION OF THE DRAWINGS

FIG. 9 is a representative display sequence;

FIG. 10 is a perspective view in a region of a trailer hitch showing alignment between a ball of the hitch and a receiver attached to the trailer;

DESCRIPTION OF EXEMPLARY EMBODIMENT FOR PRACTICING THE INVENTION

Figure 1:
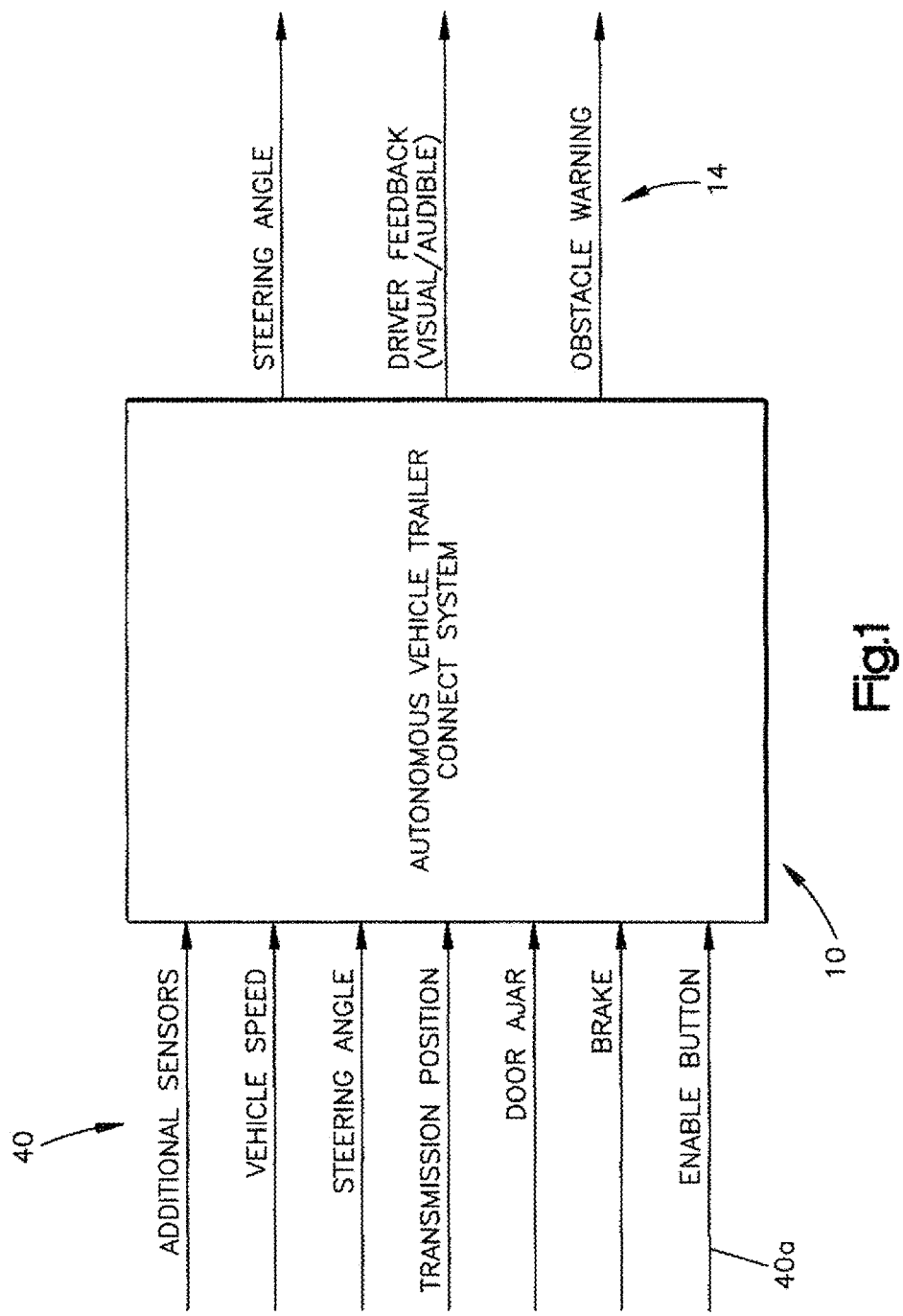
FIG. 1 is a basic block diagram schematic of a representative system for automated trailer/vehicle alignment.

The drawings depict an autonomous or automatic vehicle trailer connect system for use with a vehicle. Referring to FIG. 1, one disclosed exemplary embodiment of the invention is shown to include a control system 10 that monitors a number of signal inputs 40 and creates control outputs 14. The control system 10 is shown in greater detail in FIG. 2 and includes a control circuit 20 that includes a microcontroller 21, an input conditioning circuit 22, a communications circuit physical layer 23, an operator feedback driver circuit 24, visual driver feedback module 24a, and an obstacle warning driver circuit 25 with associated audible driver feedback module 25a. The control system 10 also includes image gathering apparatus 30. Various vehicle parameters 40 are obtained through vehicle communications with sensors 40 although they could be directly coupled to the control. The vehicle parameters are used in conjunction with the image gathering apparatus. A presently preferred microcontroller (21) is ADBF542WBBCZ commercially available from Analog Devices, Inc.

The image gathering apparatus 30 interfaces with the control module 20. The interface may be a direct connection from apparatus 30 or it may interface through vehicle bus communication such as the standard automotive CAN protocols. These protocols are published under documents from the Society of Automotive Engineering (SAE) under J1850, J1699-1, J1939 and others. Other published documents defining communications protocols are available from the International Organization for Standardization (ISO) as ISO 11898 and are incorporated by reference in their entirety for all purposes. The exemplary image gathering apparatus 30 is a standard image gathering camera that is already found on many vehicles. One suitable camera is commercially available from Chrysler LLC having part number 56054059AC.

The camera provides an image to the control circuit 20 for interpretation. The produced image may be black and white or color, and may be of various resolutions to provide adequate information for determining target parameters. The image produced may be from a single camera or from two or more cameras. A single camera provides sufficient information to determine a target object location of a fixed or known height. Two or more cameras allow for determining a target object location and its height relative to the vehicle. It is understood that the image gathering apparatus 30 does not have to be a conventional digital camera. The image produced and communicated to the control circuit 20 could come from various two dimensional or three dimensional image gathering devices such as LIDAR (Light Detection and Ranging), RADAR, infrared imaging, ultrasonics, and the like.

Figure 3:
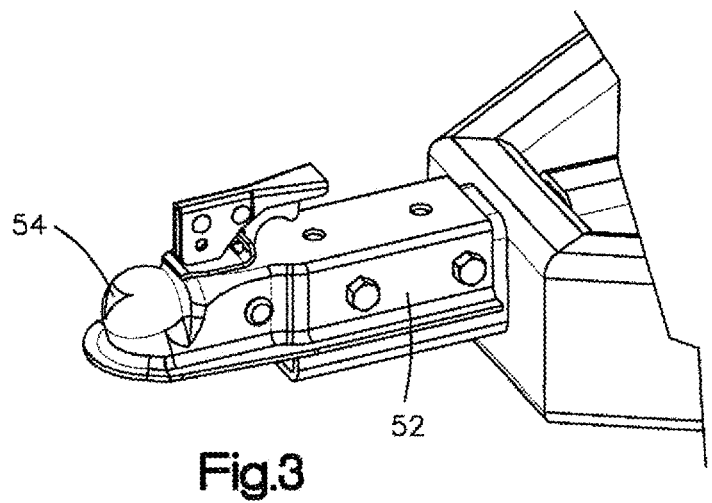
FIG. 3 is a trailer hitch receiver having a target symbol for use with the system.
Figure 4:
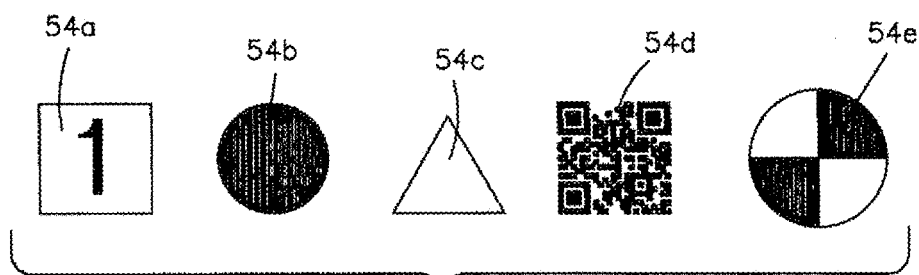
FIG. 4 shows an assortment of possible target symbols.
Figure 5:
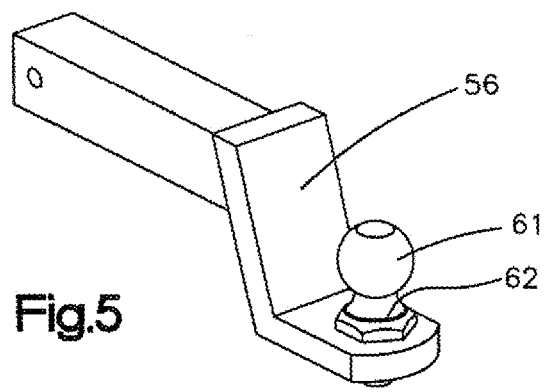
FIG. 5 is a perspective view of a motor vehicle hitch including an upwardly extending ball for attaching a trailer to the hitch.

Referring to FIGS. 3-5 the exemplary embodiment uses a target 54 placed on a trailer hitch receiver 52 such that the image sensor 30 has a clear view of the target. The target may be a shape, a pattern, a color or any combination of the above. System targets, samplings 54a, 54b, 54c, 54d, 54e of which are shown in FIG. 4, may be of any color that can be easily recognized such as blue, red, or yellow. The colored shape may be of one color or bordered by a color such as a yellow triangle with a black border. The shape itself may be round, square, triangular, or it may be a quick response code (QR) or other information containing symbol.

Figure 16:
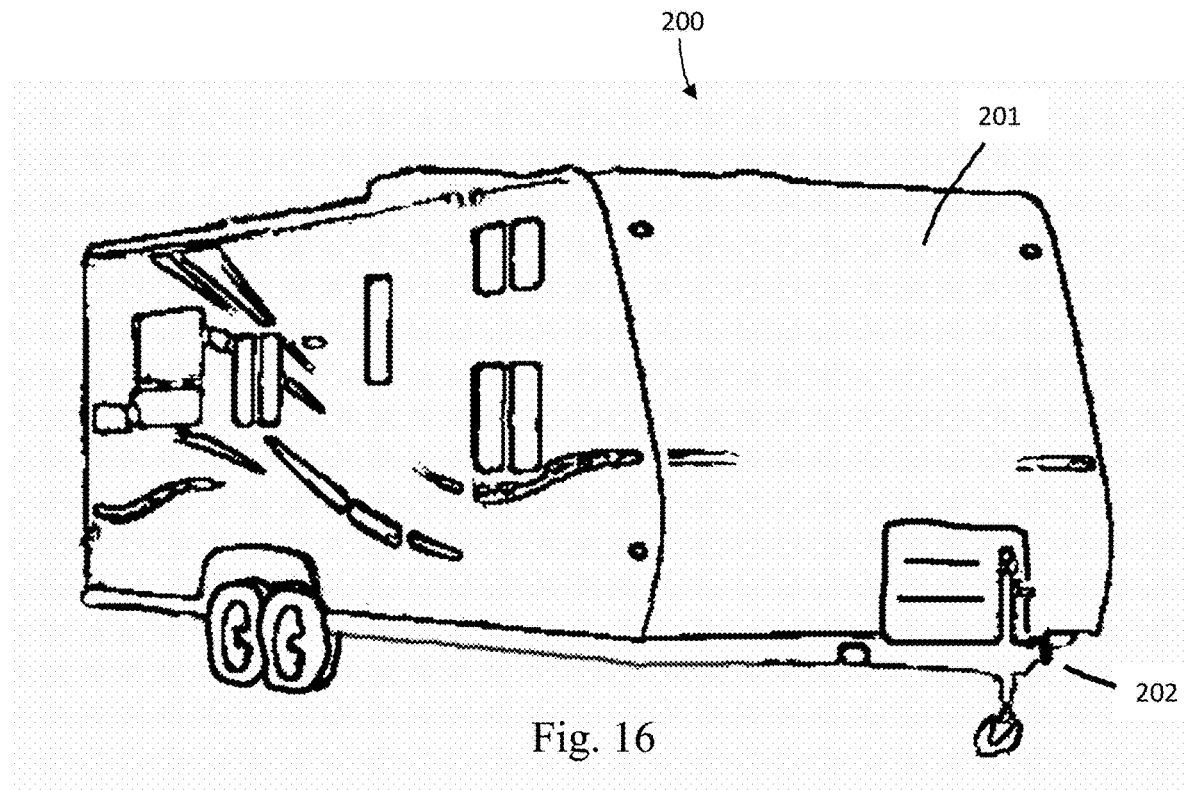
FIG. 16 is a sample image of a trailer with an identifying mark on the hitch receiver portion.
Figure 17:
FIG. 17 is the sample image of FIG. 16 that has had a color distance transform applied to it leaving only the predetermined color objects that are within a tolerance thereof.
Figure 18:
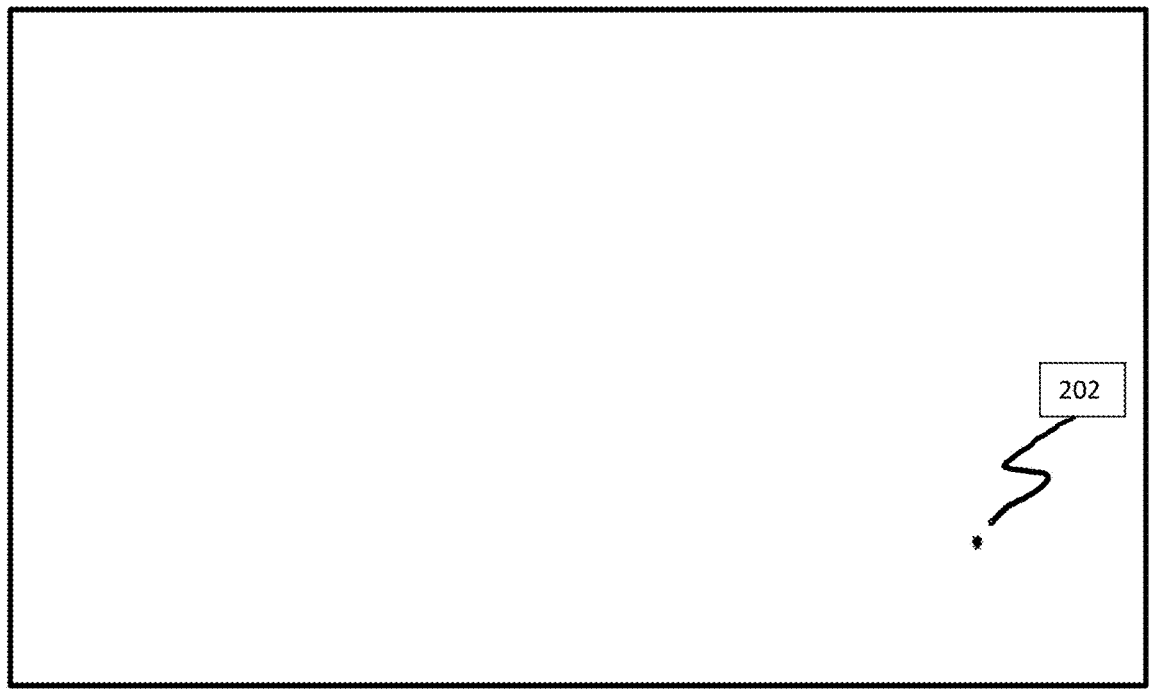
FIG. 18 is the sample image of FIG. 17 that has had a threshold level binarization performed on it resulting in only the predefined object being present.
Figure 19:
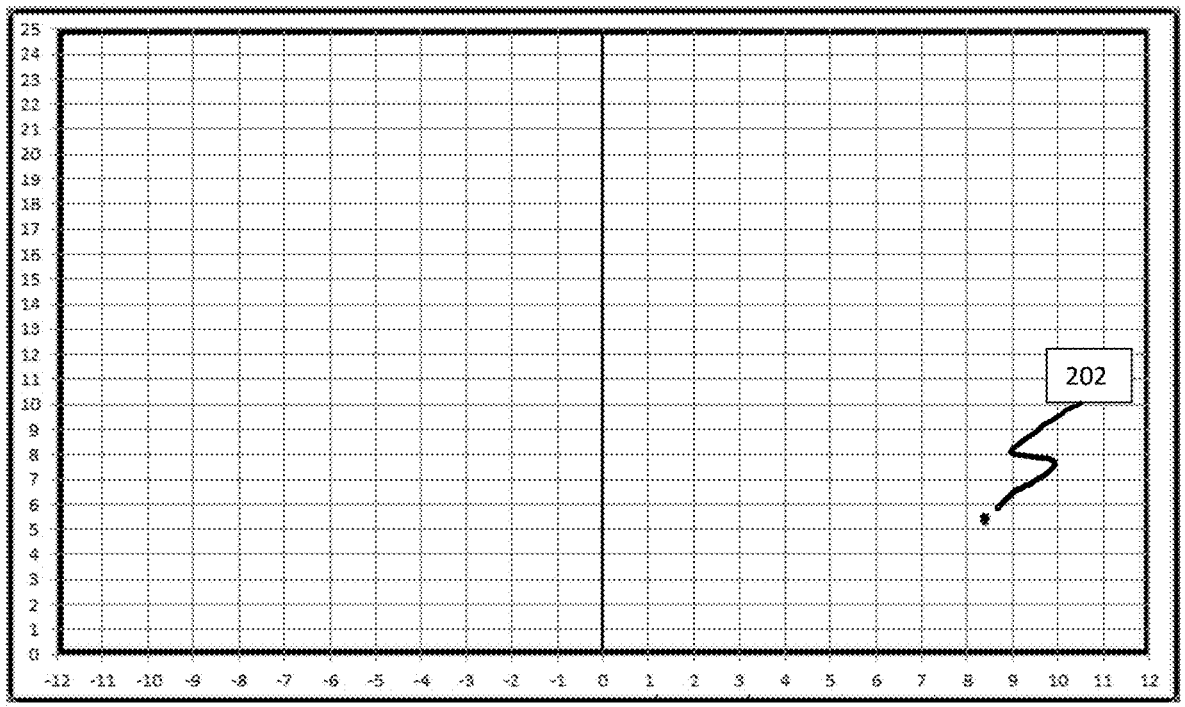
FIG. 19 is the sample image of FIG. 18 that has had a grid pattern overlaid on the image to allow for distance determination of the target in Euclidean space and as measured by pixels.

The system 10 is programmed to look for and recognize an identifying mark such as the predefined target 54 that is located at a specific location on the trailer hitch receiver portion 52. A method, according to one embodiment of the present invention, for recognizing the identifying mark such as the predefined target 54 is to perform a color distance comparison in which an object of a specific color is located by applying a color mask to an image such that only the specific predefined color is visible within a desired tolerance in a color space. As illustrated in FIG. 16, a sample image 200 of a trailer 21 with an identifying mark 202 such as the predefined target 54 on the hitch receiver portion is shown. The resultant image 200 revealing the target color may have non-target artifacts included. As illustrated in FIG. 17, the sample image 200 of FIG. 16 that has had a color distance transform applied to it leaving only the predetermined color objects including the identifying mark 202 such as the target 54 that are within a tolerance thereof. These artifacts may be removed by performing a threshold controlled binarization that will leave only the identifying mark 202 such as the predefined target 54. As illustrated in FIG. 18, the sample image 200 of FIG. 17 has had a threshold level binarization performed on it resulting in only the identifying mark 202 such as the predefined target 54 being present. It is, of course, possible to have artifacts from other non-target items included in the final image if they were within the allowed color tolerance. It is therefore also desirable in this method to have a specific shape or pattern associated with the identifying mark such as the predefined target 54. The desired shape or pattern of the predetermined target 54 may be determined to be present by using various techniques, one such being edge detection. The control module 20 may be configured with edge detection algorithms that may be used on the resultant binary image described above to highlight specific predetermined shapes or patterns. Such techniques include Canny, Sobel, Prewitt, and Roberts. As illustrated in FIG. 19, the sample image 200 of FIG. 18 has had a grid pattern overlaid on the image 200 to allow for distance determination of the identifying mark 202 such as the predefined target 54 in Euclidean space and as measured by pixels. It is understood that the control module 20 may be configured for edge detection, binarization, and color detection and combined in any appropriate order, or each by itself.

A hitch ball 61 (FIG. 5) that is on the vehicle is at a known location so that there would be no recognition requirements for it. In the event that a system is implemented where the ball position is not known, a visual interrogation of the area behind the vehicle could also determine the ball location similar to the targeting system described for identifying where the trailer hitch receiver portion is located. The ball could be colored, or a colored collar 62 could be placed at the base of the ball as shown in FIG. 5. The collar could be of a predefined color or shape such that the system 10 will recognize it and determine its location. An exemplary system 10 would recognize the spherical shape of the ball and determine where it is located without the need for a colored or shaped target.

Figure 6:
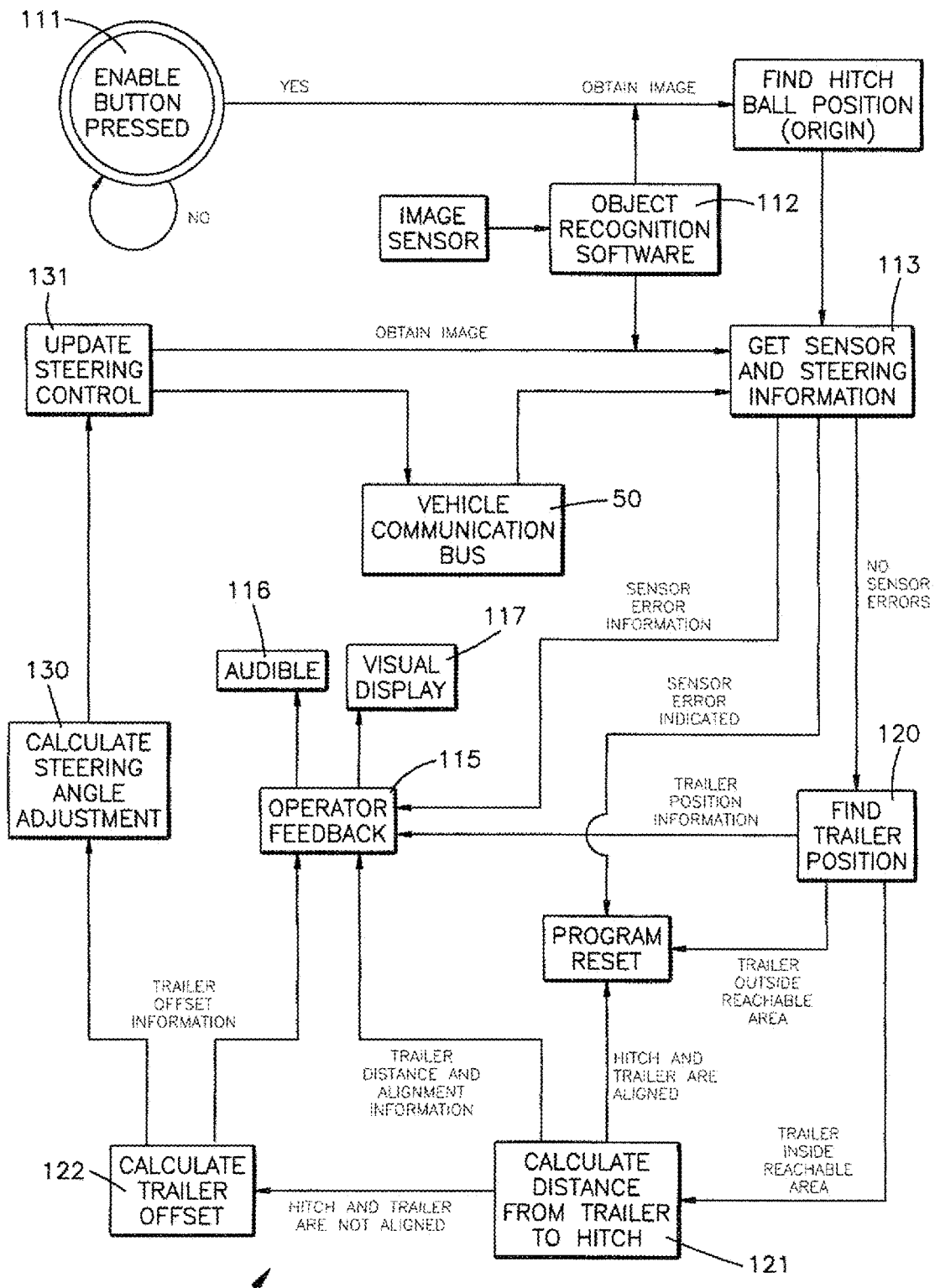
FIG. 6 is a basic flow diagram depicting the logic flow of the system.

When the locations of both the vehicle ball and the trailer hitch receiver portion have been determined, the control circuit 20 processes the images and determines distance between the two objects. Based on the distance between them and the turning characteristics of the particular vehicle, a route is determined that will align the vehicle ball and the trailer hitch. A flow diagram 110 shown in FIG. 6 details this process.

The route to take is achieved by turning the steering wheel of the vehicle to the correct angle so that when the distance between the vehicle ball and the trailer hitch closes to zero the ball and the hitch will be aligned such that the trailer hitch may simply be lowered onto the ball of the vehicle as shown in FIG. 10. The lowering of the trailer hitch onto the ball may be done by the motorist or automatically. An automatic system could entail a vehicle that lowers the rear suspension (kneels) so that the ball 61 can be moved under the trailer hitch. This is implemented by the controller communicating with a suspension control by means of the vehicle bus 50. Reference U.S. Pat. Nos. 6,470,248 and 6,428,363 which are incorporated herein by reference in their entirety for all purposed. When alignment is achieved the vehicle raises to normal suspension height, thereby engaging the hitch. It should be noted that the calculations to achieve proper alignment are being performed continuously to ensure that a proper route is maintained throughout movement of the vehicle.

Referring to flow diagram 110, the system is enabled by the vehicle operator pressing or touching a designated switch or location 111. The control module 20 will then obtain an image from image sensor 30 and process the image information using object recognition software routines 112 that determine if specific predetermined shapes and/or colors are present in the field of view of image sensor 30. An alternate exemplary system can "learn" the presence of a particular marker (different from those in FIG. 4) in the field. Such a system would identify discrete items within the camera field of view and then allow a user to certify the correct marking. Confirmation of the correct hitch and/or marking thereof can be accomplished by the user engaging with a visual display 117. The visual display 117 will show the identified items in the field of view and will accept a particular item based on operator feedback 115. The feedback can be by discrete physical switch, or in the case of a touch screen, a video button shown on the display or by touching the video image of the selected object on the screen. It is understood that the anticipated target does not need to be predetermined by the system and that the user may simply select the desired target. Once the user has selected the desired target, the system will begin the calculations for moving the vehicle to the selected hitch.

The control 20 will then use a predetermined location for the vehicle hitch ball or it will use information gathered from image sensor 30 and processed by object recognition software 112 to determine the location of the hitch ball. Moving on to software block 113, control 20 obtains vehicle sensor information from vehicle bus 50. The vehicle communication bus 50 could be CAN protocol based as shown in CAN Bus 50 in FIG. 2 or it could be any other vehicular bus type such as LIN, FlexRay, J1939, or the like, as required. Software routines of block 113 will determine if pertinent vehicle sensors such as doors closed, reverse gear, vehicle and engine speed, hatch closed, or obstacle detection are in acceptable states. If there are unacceptable sensor states, or hitch or ball locations cannot be determined, the control 20 will terminate the automatic alignment process and will send a status indicating signal to operator feedback routine 115. Software routine 115 will provide the required information to audible routine 116 and visual display routine 117. Audible routine 116 is coupled with the circuit 25a and Visual display routine 117 is coupled to the circuit 24a, both of FIG. 2.

Figure 7:
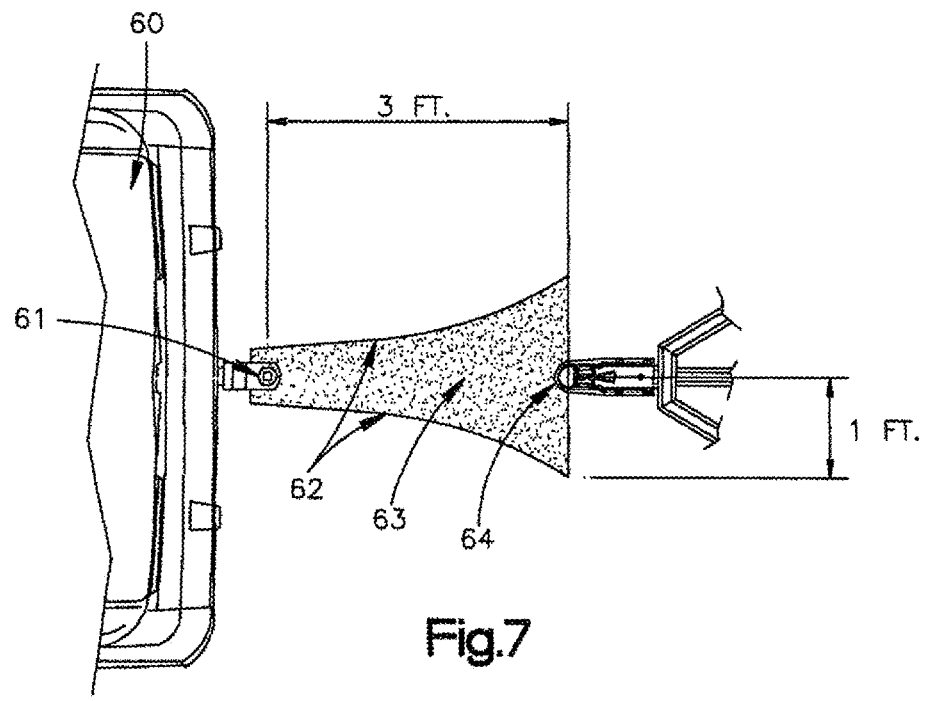
FIG. 7 shows the vehicle to trailer hitch relationship and an area between the vehicle and trailer hitch.
Figure 13:
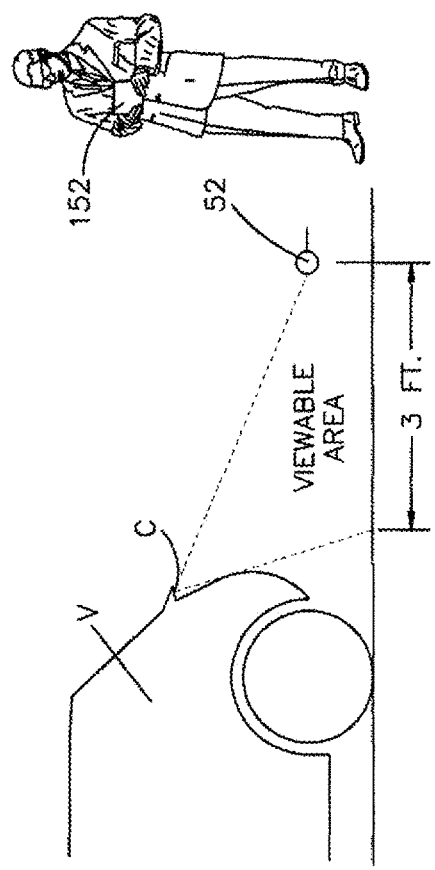
FIG. 13 is a schematic elevation view of a trailer hitch region of a vehicle.
Figure 14:
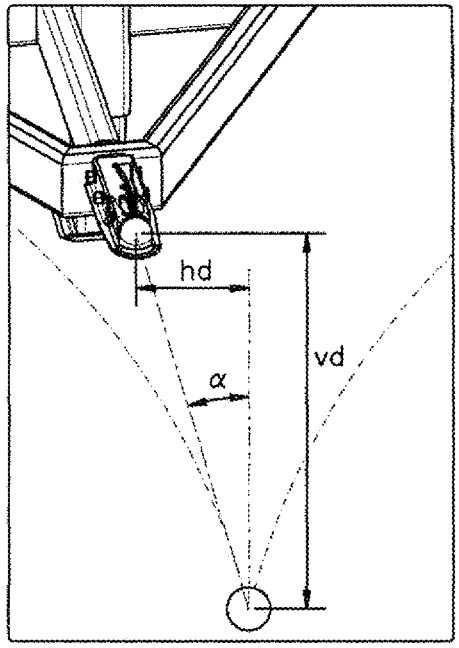
FIGS. 14 and 15 are simulated images of a type that appear on a dash mounted monitor during capture of such images by a camera C mounted to the rear of a vehicle V.
Figure 15:
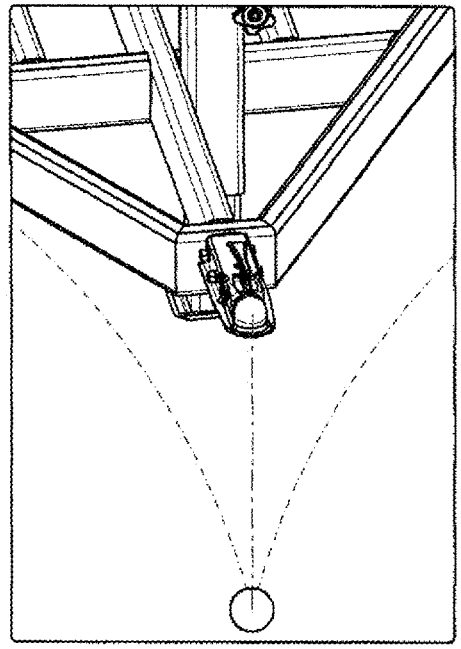
Figure 15A:
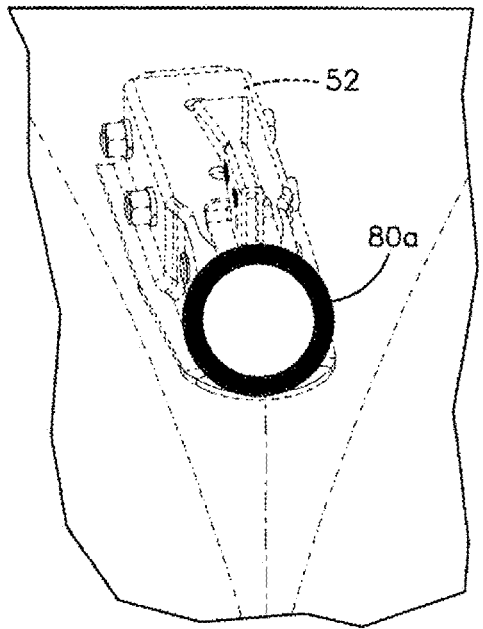
FIG. 15A is an enlarged simulated image of a trailer receiver with a confirming symbol overlying image data from the trailer receiver.

If sensor states and target locations are acceptable, software flow moves to a find trailer position routine 120 that verifies the trailer hitch receiver location is inside an area 64 defined by the boundary 63 of FIG. 7. If the hitch receiver is outside of the area that can be reached by the vehicle hitch ball the automatic alignment process will terminate and the vehicle operator will be notified. If the trailer hitch receiver is inside the reachable area, the routine 121 calculates the distance and angle from the trailer hitch receiver to the vehicle hitch ball. The vertical distance from the hitch receiver to the ball is determined using pixel count on the image sensor 30 such that vd=(y pixel count$_{hitch\ receiver}$-y pixel count$_{hitch\ ball}$). Likewise the horizontal distance, or offset, of the hitch receiver from the centerline of the vehicle is determined by routine 122 using pixel count on image sensor 30 such that hd=(x pixel count$_{hitch\ receiver}$-x pixel count$_{centerline}$). Representative depictions for two trailer positions in relation to a vehicle are shown in FIGS. 14 and 15. These two displays are 640 by 480 pixel outputs captured at thirty frames per second from the Camera C (FIG. 13). In FIG. 14 the pixel representations of vd and hd are labeled. Since the centerline of the vehicle is considered zero, the horizontal distance hd is simply the pixel count away from centerline. The angle of the trailer hitch receiver from the vehicle centerline is therefore α=arc tan(hd/vd) as can be seen in FIG. 14. Trailer hitch receiver alignment information is sent to operator feedback routine 115 for processing. As the vehicle steering wheel is controlled and the vehicle backed toward the trailer from a starting position (FIG. 14 for example) the trailer receiver becomes more closely aligned with the hitch. As seen in FIG. 15 for example, the offset (hd) has been reduced. In one embodiment, the controller superimposes a visual feedback symbol 80a (FIG. 15A) in the form of a colored circle over the trailer receiver to give an assurance to the motorist that the system 10 is tracking the position of the receiver relative to the hitch.

An optimum instantaneous steering angle (sa) for achieving alignment as defined by the steering wheel is calculated by software routine 130 using sa=(k*(α/hd)) where k is a constant that will provide the relationship between the steering wheel angle of rotation and the vehicle tire/wheel angle. It is understood that the equation may change based on proximity to the target allowing for finer control of steering angle. The steering angle in one application on a Fiat 500 is limited to ±540 degrees of rotation. It is understood that there is a direct relationship between steering wheel angle and vehicle tire/wheel angle. Calculations to derive the required turn angle may be done by the steering wheel angle or by the vehicle tire/wheel angle. An alternate embodiment will allow for the vehicle tire/wheel angle to change without affecting the steering wheel angle.

The calculated desired steering angle is sent to software routine 131 to update the steering control. Routine 131 sends pertinent information to the vehicle through vehicle communication bus 50. The vehicle power steering control then processes the requested steering wheel angle and rotates the steering wheel to the requested orientation.

Figure 2:
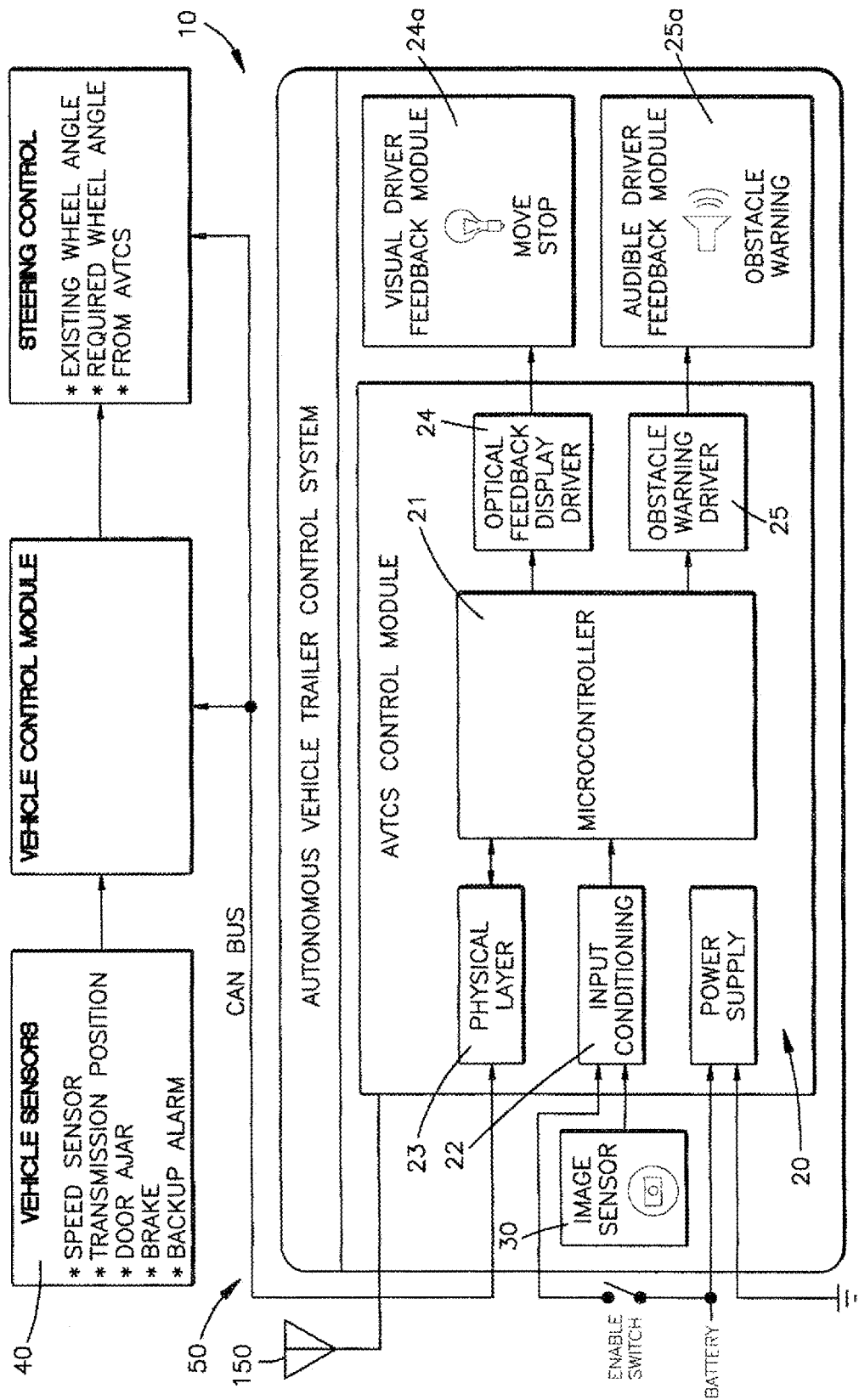
FIG. 2 is a more detailed diagram schematic of the FIG. 1 representative system.

In accordance with the exemplary control system and reference to FIG. 2, an electrical connection coupled to a vehicular communication bus 50 provides available data from the vehicle to the control system 10 for proper operation and diagnostics. The system interrogates the vehicle for signals 40 such as door open, incorrect gear, speed too fast, hatch open, steering wheel torque exceeds a threshold, or obstacle detection. Any signal or condition that is predefined as a safety issue can be programmed to terminate the auto-hitch control system 10 and alert the vehicle operator that there is an issue that needs correction. Likewise the control system 10 can notify the vehicle operator that the existing relationship between the vehicle and the trailer is such that they cannot be aligned. An example would be that the vehicle cannot turn at a sharp enough angle to achieve alignment. In a case such as this the operator will need to realign the starting relationship between the vehicle and the trailer and the system 10 informs the motorist to make this adjustment in relative positioning.

If the motorist grabs the steering wheel during either automatic or semi-automatic alignment, the automatic alignment process stops. The torque signals from a torque sensor are conveyed to the control system 10 by means of the bus 50 and automatic steering is suspended until the user reactivates the system by pressing the button 40a.

The exemplary control circuit interfaces with a vehicle mounted switch 40a for enabling and initiating the auto-hitch system. The switch would be mounted on the vehicle dash at a location convenient for the operator. The vehicle should be pre-positioned by the operator such that there is a coarse relationship between the vehicle and the trailer hitch.

Figure 8:
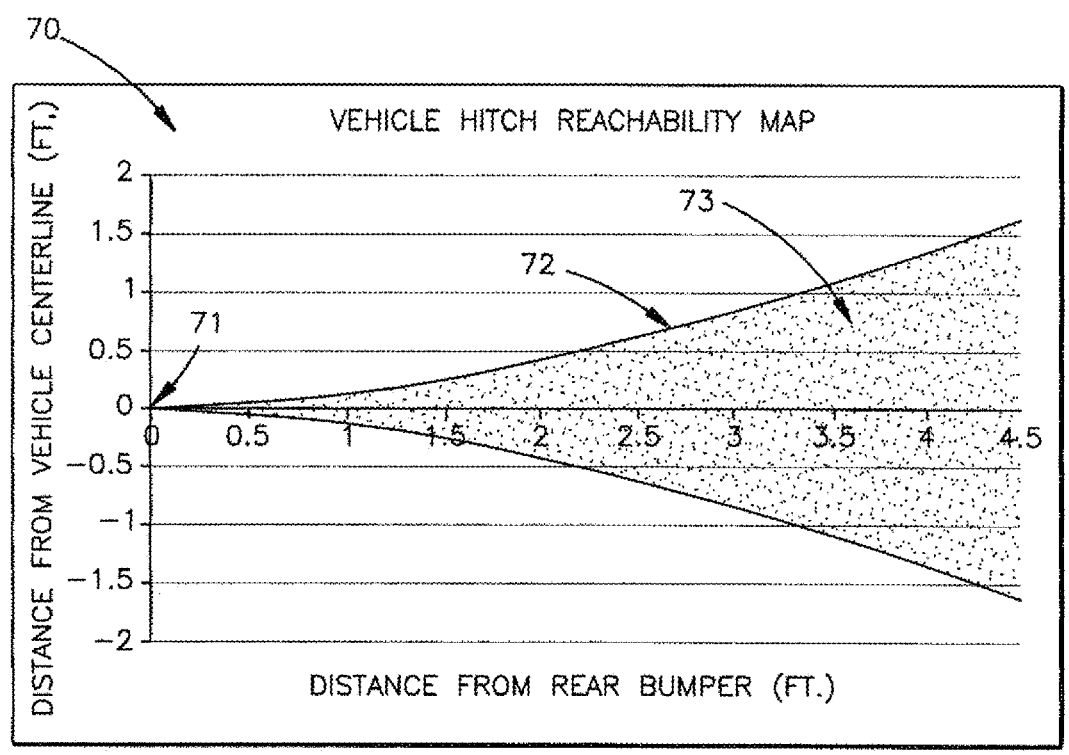
FIG. 8 shows a graphical representation of a reachable area.

Referring now to FIG. 7, a typical requirement would be that the vehicle needs to be within 3-4 feet of the trailer hitch receiver and must be within ±15 degrees from centerline with the vertex being the hitch ball 61. In FIG. 7 one can see vehicle 60 and the hitch ball 61 mounted to the vehicle. A region having bounds 63 defines an area that is reachable by the ball of the vehicle. The area 64 encompassed by the bounds 63 represents all locations that the hitch ball can be guided based on a turn radius of the vehicle. If the hitch receiver 54 is inside the bounded area 64, the position of vehicle hitch ball 61 can successfully be controlled and placed under hitch receiver 54. Referring to FIG. 8 a graph 70 shows the vehicle hitch ball 61 represented on the graph at the 0,0 coordinate location 71. A shaded area boundary 72 corresponds to the boundary 63 of FIG. 7 and the area 73 corresponds to the area 64 of FIG. 7. The curved portion of boundary 63 and 72 are defined by a simple quadratic fit of the form y=cx$^2$+bx+a. In one exemplary system the coefficients are a=0.001346, b=0.114713, and c=0.056696. This quadratic fit represents the boundary curves 63 of FIG. 7 and 72 of FIG. 8 of a reachability map for a Fiat 500. Coefficients are different for other vehicle turn radii and wheelbase lengths and hence the reachable area will also be different.

To engage the system, the brake must be pressed and the vehicle must have the reverse gear placed in position. Then, if all of the safety preconditions are met such as doors closed, speed is zero, and the like, the operator may then activate a switch by pressing it or touching it in the case where a capacitive sensing switch is employed. The system will then commence to align the vehicle to the trailer hitch.

The control system may be such that the operator is expected to control both the brake and the accelerator. The operator will know the approximate relationship between the ball and the trailer hitch by a visual display and/or acoustic signal. Referring to FIG. 9 a visual system could be a series of indicators or lights 80 either increasing from one lighted region to two lighted regions, and so on; or vice versa. It is understood that the visual display can take many forms both physically and graphically. Likewise an audible system could be implemented such that a tone type system is used to notify the operator when to slow down and when to stop by using the brake. Tone indicators could include frequency of tone occurrences (beeps per second), tone count changes based on distance (1 beep at 2 feet away, 2 beeps at 1 foot away, and so on), pitch variations, or combinations thereof. The exemplary system uses both visual and audible cues to notify the vehicle operator when to move and when to brake the vehicle. It is understood that the vehicle could incorporate an object detection/avoidance system. Systems like these are on many vehicles today and provide an audible and/or visual indication of obstacles proximal to the vehicle. They warn the operator if someone or something is behind the vehicle so that they can take action taken so as not to collide. The exemplary vehicle trailer connect system would employ such an obstruction detection system and would disable auto-hitching function if one or more backup alarm sensors detects an obstruction. One such sensor is a capacitive sensor that is mounted to a vehicle panel such as a bumper that allows for the sensing of an object proximal to the panel. Reference US patent published application 2011/0313619 which is incorporated herein by reference in its entirety for all purposed. Visual and/or audible alerts could also be employed similar to what is already used in the automotive/truck industry today.

Figure 11:
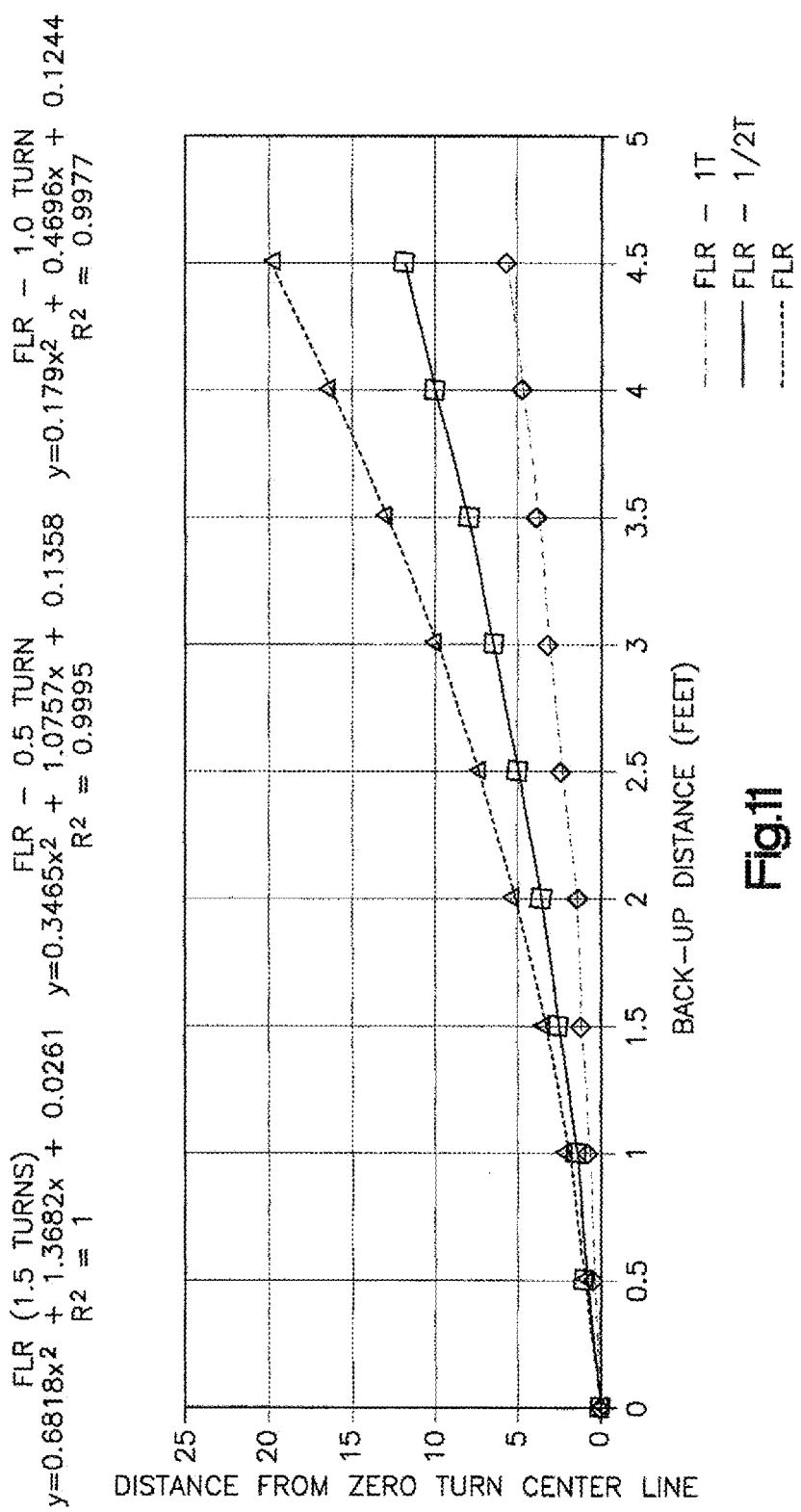
FIG. 11 is a graph depicting alternate paths of a ball of a trailer hitch based on steering wheel settings of the vehicle.
Figure 12:
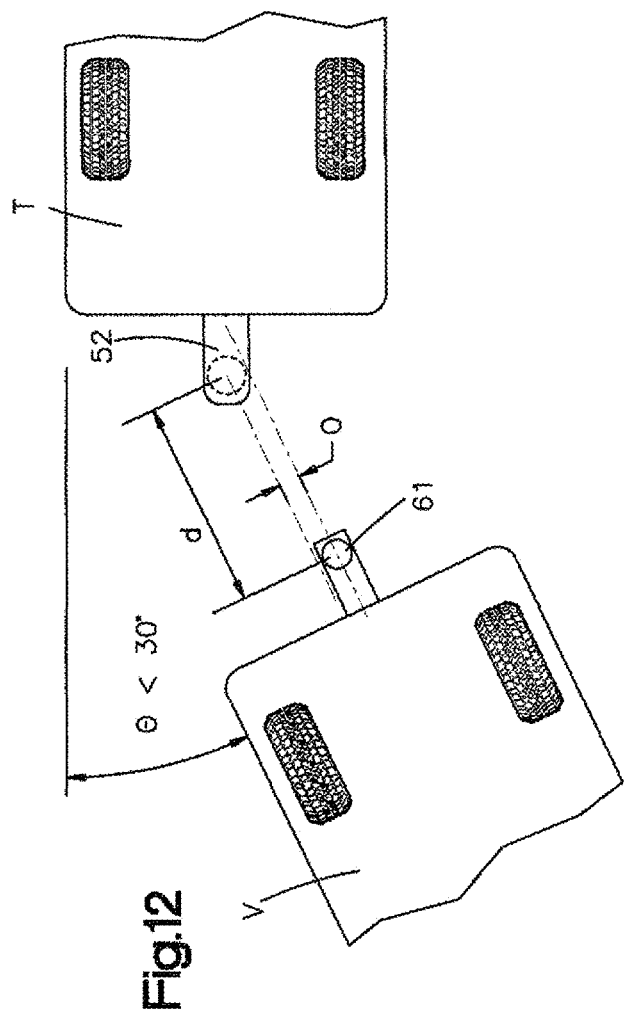
FIG. 12 is a schematic plan view of a trailer and motor vehicle.

There are many possible vehicle back up paths for reaching a particular correct relation between the ball and the region of the marker 54 on the receiver into which the ball fits during use. The preferred software implementation starts by adjusting an initial steering wheel angle and maintaining that choice until visual feedback signals from the camera confirm that a course correction is needed based on the relative position of the ball and the receiver after an initial amount of relative movement. FIG. 11 illustrates the paths of travel (based on the quadratic equations above the graph) for three different steering wheel settings. This data is tabulated (in feet) in tables 1 and 2 below. As noted above, this data is specific to a particular motor vehicle. In the table labeled raw data, an initial offset O (0.25 feet or 3 inches) (FIG. 12) exists between the ball and the receiver, i.e., the receiver is not aligned with the center line of the vehicle and would not be properly positioned should the motorist merely back up the vehicle. In the FIG. 11 graph the term "FLR" refers to the "full lock right" orientation of the steering wheel.

TABLE 1

Raw Data

| Backup Distance (Ft) | FLR-1T | FLR-1/2T | FLR |
|---|---|---|---|
| 0 | 0.250 | 0.250 | 0.250 |
| 0.5 | 0.750 | 1.125 | 1.125 |
| 1.0 | 1.125 | 1.875 | 2.375 |
| 1.5 | 1.438 | 2.813 | 3.875 |
| 2.0 | 2.063 | 3.938 | 5.750 |
| 2.5 | 2.750 | 5.250 | 7.938 |
| 3.0 | 3.250 | 6.563 | 10.500 |
| 3.5 | 4.125 | 8.313 | 13.375 |
| 4.0 | 5.125 | 10.313 | 16.688 |
| 4.5 | 6.188 | 12.250 | 20.250 |

TABLE 2

Normalized

| Backup Distance (Ft) | FLR-1T | FLR-1/2T | FLR |
|---|---|---|---|
| 0 | 0 | 0 | 0 |
| 0.5 | 0.500 | 0.875 | 0.875 |
| 1.0 | 0.875 | 1.625 | 2.125 |
| 1.5 | 1.188 | 2.563 | 3.625 |
| 2.0 | 1.813 | 3.688 | 5.500 |
| 2.5 | 2.500 | 5.000 | 7.688 |
| 3.0 | 3.000 | 6.313 | 10.250 |
| 3.5 | 3.875 | 8.063 | 13.125 |
| 4.0 | 4.875 | 10.063 | 16.438 |
| 4.5 | 5.938 | 12.000 | 20.000 |

It is noted that FIG. 11 depicts data for three paths but an initial steering wheel setting would typically be between these three paths. It is also noted that as movement progresses, path corrections occur due to continuous updating of the image obtained by the camera C (exemplary system every 100 milliseconds) so that the steering wheel position is constantly adjusted based on then current offset O and separation data d. Additionally, the present system relies on motorist operation of the accelerator and brake and only the steering is controlled by the system 10 in the continuous matter described.

Additional Embodiments

In another embodiment of the present invention, the system could be fully autonomous such that the vehicle operator engages the system and the vehicle trailer connect system 10 controls all aspects of the trailer connection operation including gear selection, steering, acceleration, and braking. The operator would have to take no action in the alignment process other than initiating the alignment by actuating a switch. It should be appreciated that various combinations of vehicle control can be implemented from fully autonomous to only steering control. It should also be appreciated that the aforementioned safety related sensors would still be employed to ensure the safest possible operation.

In yet another embodiment of the present invention, the system would allow for the system to be engaged remotely by a vehicle key fob. If the vehicle is set in the proper starting position and safety and operational consideration are taken into account, the disclosed hitching sequence could be initiated by a button on the vehicle key fob. This would allow for the operator to watch the system from outside of the vehicle and be ready to lower the hitch onto the ball when alignment is complete.

In a further embodiment of the present invention, the system 10 is also a remote execution of the auto-hitch sequence but by using a cell phone/smart phone with an application running on it that allows for vehicle control to take place. The communications to and from the vehicle could be such that the phone could display the image that the vehicle is using to perform the trailer alignment function. It could also give telematics information such as speed, steering angle, distance to target, and so forth. In such an embodiment, the system 10 includes an antenna 150 for performing communications or alternatively, the communication could occur using an already existing antenna with data transmitted to and from the controller 21 by means of the vehicle bus 50.

In another embodiment of the present invention, the system 10 allows for remote execution of the auto-hitch sequence by using a tablet 152 such as an iPad manufactured by Apple, Inc. of Cupertino, Calif. or a Galaxy Tab by Samsung Electronics Co., Ltd. of Suwon, South Korea with an application running on the tablet that allows for vehicle control and monitoring to take place. The communications to and from the vehicle controller is such that the device displays the image that the vehicle is using to perform the trailer alignment function. It also gives telematics information such as speed, steering angle, distance to target, and so forth. It is contemplated that any appropriate interface device that implements direct communication such as Bluetooth, Wi-Fi, ZigBee, Z-Wave, or the like; or indirect communications such as through cell phone service could be used.

In yet another embodiment of the present invention, the system 10 uses an RFID tag transponder that gives a vehicle mounted receiver a target to home in on. A receiver and antenna system interrogates the RFID tag signal and determines the direction and distance from the tag. The calculation allows the vehicle to back up and align with the tag. This system has advantages over visible light based imaging systems in that the system works in the dark and in dense fog. It also allows for a greater starting distance between the vehicle and the trailer.

In still another embodiment of the present invention, the system 10 reverses the steering direction when in trailer backup mode. One of the benefits of electric steering is that there is no direct mechanical linkage from the steering wheel to the vehicle wheels. This affords the capability to alter the relationship between the steering wheel and the vehicle wheels as desired for different applications. Hence in a trailer backup mode the electric steering can reverse its direction so when the steering wheel is turned left, the wheels will turn right and vice versa. In this way when backing up with a trailer there will not be the reverse steering issue that many drivers have problems with. In addition a vehicle data gathering device such as a camera can monitor the relationship between the vehicle and the trailer as the operator backs up. In the event that a jackknife condition is likely to occur, the system 10 will compensate to eliminate the condition. If avoidance is not possible the system 10 will alert the operator to the potential hazard. The system could also automatically brake the vehicle so that damage to the trailer and vehicle is avoided.

In a further embodiment of the present invention, the system 10 employs voice commands to engage the system 10 and select the desired hitch and/or target 54 thereof. Such a system 10 with communications to and from an autonomous or automated vehicle could be implemented such that a person may desire that a particular trailer be attached to a vehicle. For example, the control module 20 may be configured to receive the communications or commands such as voice commands. The person could give a spoken verbal command to a particular vehicle, referencing the particular trailer by an ID number or the like, via cell phone or tablet, or any number of Internet of Things (IoT) devices or home automation or assistance devices such as Amazon's Echo, Dot, or Show devices, Google's Home device, or Apple's SIRI service built into a smart phone or tablet, or some other device. Once the verbal command is given, an authorization code or other unique method is used to confirm that an authorized person is issuing a command. For example, the control module 20 may be configured to confirm that an authorized person is issuing a command. Authorization could be in the form of a password or PIN number similar to a bank card, a finger print from a sensor such as those integral with certain phones and tablets, face or iris recognition, a unique code transmitted from a mobile device such as a cell phone, tablet, or key fob. A unique code can be transmitted to the control module 20 using standard automotive key fob RF link, Bluetooth, near field communication, or other like mechanism. Once the verbal command is given and authorized, the smart device or service transmits a communications message to the control module 20 of the requested vehicle. The vehicle then starts and moves on its own automatically or autonomously navigating to where the desired trailer is located. The vehicle then will align itself and backup such that the trailer can be placed on the vehicle hitch manually or automatically. In the case where the trailer is automatically attached to the vehicle, the vehicle can then navigate back to where the person who gave the command is located, or to a location of the person's choice. While voice commands have been described, it should be appreciated that commands could also be transmitted to a vehicle via text message, a software application that resides on a person's smart device, a website, or other non-spoken method. It should also be appreciated that the controller or control module 20 is configured to start and move the vehicle.

In another embodiment of the present invention, the system 10 integrates the vehicle trailer connect system 10 with other vehicle functions so as to reduce the number of required electronic modules and components therein. One such function is park assist. This function is incorporated into system 10 so that the signal from an image gathering device such as a camera, and the image tracking and obstacle avoidance algorithms of the vehicle trailer connect system 10 are used to aid in the parking function.

While the invention has been described with a degree of particularity, it is the intent that the invention include all modifications and alterations from the disclosed design falling within the spirit or scope of the appended claims.

What is claimed is:

1. A system for positioning a trailer hitch attached to a motor vehicle with respect to a trailer hitch receiver attached to a trailer comprising:
    a visually colored single target disposed on the trailer hitch receiver for identifying a position of the trailer hitch receiver;
    one data gathering device spaced from the single target for obtaining picture element data from an observation region of a trailer hitch between the trailer hitch and a trailer hitch receiver positioned within the observation region of the trailer hitch;
    a controller for monitoring separation data from the region of the trailer hitch and determining a target path of travel for the vehicle to achieve a predetermined relation between the trailer hitch and a trailer receiver connected to the trailer;

a vehicle steering system, wherein the vehicle steering system reverses a normal steering wheel of the motor vehicle to a vehicle wheel turning relationship so that rotation of a steering wheel in one sense causes motor vehicle wheels to rotate in an opposite sense when backing a trailer; and an interface for communicating vehicle information to the controller including an actuation signal for initiating hitch/receiver alignment and conveying command signals to the vehicle steering system based on the target path of travel.

2. The system of claim 1 wherein data gathering device is a camera for capturing an image of the region of the trailer hitch.

3. The system of claim 1 further comprising a display for indicating a distance between the trailer hitch and the trailer hitch receiver.

4. The system of claim 1 wherein the interface includes a system bus that provides a video image to the controller.

5. The system of claim 1 wherein said controller is configured to receive voice commands from an operator to engage said system.

6. The system of claim 5 wherein said controller is configured to receive voice commands from an operator to select one of the trailer hitch receiver and target on a particular trailer.

7. The system of claim 6 wherein said controller is configured to receive a spoken verbal command to a particular motor vehicle.

8. The system of claim 7 wherein said controller references a particular trailer by an ID number.

9. The system of claim 8 wherein said controller is configured to receive the ID number via one of a cell phone, a tablet, and an Internet of Things (IoT) device, and a home automation device.

10. The system of claim 7 wherein said controller is configured to receive an authorization code once the verbal command is given to confirm that an authorized person is issuing the verbal command.

11. The system of claim 10 wherein said authorization code is one of a password, PIN number, a finger print, face recognition, and iris recognition.

12. The system of claim 10 wherein said authorization code is a unique code transmitted from a mobile device.

13. The system of claim 12 wherein said mobile device is one of a cell phone, a tablet, and a key fob.

14. The system of claim 12 wherein said unique code is transmitted using one of an automotive key fob, RF link, Bluetooth, and near field communication.

15. The system of claim 7 wherein said controller is configured to transmit a communications message to the particular motor vehicle once the verbal command is given and authorized.

16. The system of claim 7 wherein the controller is configured to start the particular vehicle and move the particular vehicle automatically or autonomously and navigating to where the particular trailer is located.

17. The system of claim 16 wherein the controller is configured to align the particular motor vehicle and backup the particular motor vehicle such that the particular trailer can be placed on the vehicle hitch manually or automatically.

18. The system of claim 17 wherein the controller is configured to navigate the particular motor vehicle back to one of where the operator who gave the command is located and a desired location specified by the operator in the case where the trailer is automatically attached to the vehicle.

19. A method of aligning a motor vehicle with a trailer comprising:

placing a visually colored single target on the trailer hitch receiver for identifying a position of the trailer hitch receiver;

obtaining with one data gathering device an image of a region occupied by a trailer hitch and a trailer hitch receiver having the single target for identification of the trailer hitch;

defining a boundary having an area therein reachable by the trailer hitch to the trailer hitch receiver that can be guided based on a turn radius of the motor vehicle;

verifying that the single target is inside the area defined by the boundary;

analyzing a region occupied by a trailer hitch attached to a vehicle and a trailer receiver attached to a trailer to determine an initial distance between a specified portion of the trailer hitch and a specified portion of the receiver;

based on the vehicle turning characteristics and the initial distance determining a target path of the travel to bring the trailer hitch and the trailer receiver into a predetermined relation with each other to facilitate engagement between the hitch and receiver;

reversing a normal steering wheel of the motor vehicle to a vehicle wheel turning relationship so that rotation of a steering wheel in one sense causes motor vehicle wheels to rotate in an opposite sense when backing a trailer; and communicating command signals to a vehicle steering system based on the target path for moving the vehicle toward the trailer to at least approximately achieve the predetermined relation.

20. The method of claim 19 wherein a controller communicates with the vehicle by means of a communications bus.

21. The method of claim 20 including a step of receiving voice commands from an operator to engage the system.

22. The method of claim 21 including a step of receiving voice commands to select one of the trailer hitch receiver and the target.

23. The method of claim 22 including a step of receiving a spoken verbal command to a particular motor vehicle.

24. The method of claim 23 wherein the controller references a particular trailer by an ID number.

25. The method of claim 24 including a step of receiving the ID number via one of a cell phone, a tablet, and an Internet of Things (IoT) device, and a home automation device.

26. The method of claim 23 including a step of receiving an authorization code once the verbal command is given to confirm that an authorized person is issuing the verbal command.

27. The method of claim 26 including a step of transmitting a communications message to the particular motor vehicle once the verbal command is given and authorized.

28. The method of claim 27 including a step of starting the particular vehicle and moving the particular vehicle on its own automatically or autonomously and navigating to where the particular trailer is located.

29. The method of claim 28 including a step of aligning the particular motor vehicle and backing up the particular motor vehicle such that the particular trailer can be placed on the vehicle hitch manually or automatically.

30. The method of claim 29 including a step of navigating the particular motor vehicle back to where the operator who gave the command is located or a desired location specified by the operator in the case where the trailer is automatically attached to the vehicle.

31. A method comprising the steps of:
placing a predefined visually colored single target on a trailer hitch receiver of the trailer for identifying a position of the trailer hitch receiver;
obtaining with one data gathering device data of a region from a trailer hitch attached to a vehicle to determine the relationship of the trailer to the vehicle;
recognizing the predefined visually colored single target to perform a color distance comparison, the predefined visually colored single target having at least one specific color;
applying a color mask to an image from the one data gathering device such that only the at least one specific color is visible within a desired tolerance in a color space;
analyzing the region to determine the relationship of the trailer to the vehicle;
reversing a normal steering wheel of the vehicle to a vehicle wheel turning relationship so that rotation of the steering wheel in one sense causes the vehicle wheels to rotate in an opposite sense when backing a trailer; and
monitoring a relationship between the trailer and the vehicle control while backing the vehicle and the attached trailer.

32. The method of claim 31 including a step of revealing the at least one specific color having non-target artifacts included in a resultant image after applying the color mask.

33. The method of claim 32 including a step of removing the non-target artifacts by performing a threshold controlled binarization that will leave only the predefined visually colored single target.

34. The method of claim 31 including a step of determining a specific shape or pattern associated with the predefined visually colored single target by using edge detection.

* * * * *